April 14, 1959 S. B. RODMAN 2,882,425

BIASED DIODE SWITCHING MEANS

Filed Sept. 30, 1955

INVENTOR.
SHERWIN B. RODMAN

BY Lyon & Lyon

ATTORNEYS

United States Patent Office 2,882,425

Patented Apr. 14, 1959

2,882,425

BIASED DIODE SWITCHING MEANS

Sherwin B. Rodman, Manhattan Beach, Calif., assignor to Brubaker Electronics, Inc., Los Angeles, Calif., a corporation of California Application September 30, 1955, Serial No. 537,794

13 Claims. (Cl. 307—88.5)

The present invention relates to improved switching means for high frequency currents such as, for example, video currents in a radar system.

In general, the present invention contemplates switching means for high frequency currents which uses biased diodes connected in a novel manner to allow switching at high rates. The biased diodes and related circuit components are mounted in a hermetically sealed case having a conventional plug-in base to allow convenient connection and disconnection from related circuitry.

A general object of the present invention therefore is to provide improved means and techniques of the character outlined above.

A specific object of the present invention is to provide improved switching means that do not require a movable element, thereby allowing operation at high rates.

Another specific object of the present invention is to provide improved switching means which is provided in the form of a plug-in circuit element.

Another specific object of the present invention is to provide circuitry for biased diodes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
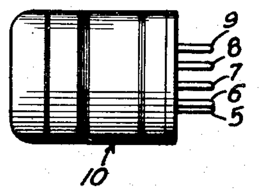
Figure 1 is a view in elevation of a switch embodying features of the present invention.
Figure 2:
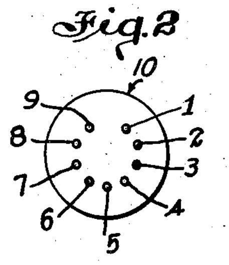
Figure 2 is a view in elevation showing the base end of the switch shown in Figure 1.

The switching means is provided in the form of an article of manufacture and includes electrical circuitry contained in a hermetically sealed case 10 and connected to certain ones of a series of pins 1–9, inclusive, projecting outwardly from such case for plug-in mounting and connection to other related circuitry.

The switching means presently described has many uses and, for example, as described specifically herein, may be used to control the passage of a pulse from the input terminal or pin 5 to the output terminal or pin 4.

The pulse 11 is applied from a source 12 having one of its terminals grounded and the other one of its terminals connected to terminal 5. Such pulse 11 may have an amplitude of from 10 to 20 volts, a duration of approximately 0.5 microsecond, a rise time of 0.15 microsecond, a fall time of 0.2 microsecond and a repetition rate of 4000. When pin 1 is grounded, the pulse appears on the output pin 4 with an amplitude of approximately 85% of the amplitude of the pulse applied to pin 5, assuming that such pin 4 is connected to a load represented by resistance of 10,000 ohms connected in shunt with a capacitance of 50 micro-microfarads. With the control terminal 1 ungrounded, the amplitude of the signal or pulse appearing on output terminal 4 is approximately 5% of the amplitude of the applied pulse.

The input terminal 5 and output terminal 4 are connected together through the biased diode 14 and condenser 15, the cathode portion of such diode 14 being connected through resistance 16 to one terminal of each of resistances 17 and 18. The other terminals of resistances 17 and 18 are connected respectively to pins 1 and 9. Pin 1 is connectable to ground through the external switch 20 which may, if desired, be an electronic type of switch for fast action. As described more fully later, the composite switch is "On" when the switch 20 is in its "On" position, and, conversely, the composite switch is "Off" when switch 20 is in its "Off" position.

Pin 9 is connected to the positive terminal of a 28 volt source 22 having its negative terminal grounded.

Pin 2 is grounded and is connected to pin 1 through condenser 24.

Pin 5 is connected to pin 9 through a series connection including the series connected condenser 26, the diode 28 and resistance 30 in that order; and, the anode portion of diode 28 is connected through resistance 32 to pin 1.

In describing the operation of the circuit, it is first assumed that the switch 20 serves to ground terminal 1 to place the composite switch in its On condition wherein the input pulse applied to terminal 5 appears with slightly diminished intensity on pin 4 which is connected to a load represented by the series connected resistance 34 and condenser 36. In such case, a current flows from the positive terminal of source 22 through resistances 18 and 17 to ground to thereby provide a relatively low voltage at the junction point of resistances 17 and 18. This relatively low voltage applied to the cathode portion of diode 14 is overcome by the relatively large positive pulse applied to terminal 5 and thus such diode 14 conducts, when the pulse is present, to open the signal path between pins 5 and 4. Under these conditions, the diode 28 is prevented from becoming conductive due to the positive voltage applied from source 22 to the cathode portion of such diode 28. Also, under these conditions, the pulse produces a current flow through the series circuit comprising condenser 26 and resistance 32 to provide some additional loading for source 12.

When the switch 20 is in its ungrounded position, the composite switch is in its Off condition. Thus, when terminal 1 is ungrounded, substantially the full voltage of source 22 appears across condenser 24 and also on the cathode portion of diode 14, thereby preventing the diode 14 from becoming conductive, even though the pulse 11 is applied to the anode portion of diode 14. Also substantially full voltage of source 22 is applied through resistance 32 to the anode portion of the diode 28, thereby causing the anode and diode portions to be at substantially the same potential to allow such diode to produce a current flow through the same in response to the positive pulse 11 to produce a desirable amount of loading for the source 12. The current in such case flows from the source 12 through condenser 26, diode 28, resistance 30, bypass condenser 22A and ground. The magnitude of this current flow, determined by the magnitude of resistance 30, is preferably adjusted so that the same amount of current flows from source 12 in both positions of the control switch 20.

For these purposes, the various circuit elements may have the following representative magnitudes:

| | | |
|---|---|---|
| Resistance 16 | ohms | 27,000 |
| Resistance 17 | do | 1,500 |
| Resistance 18 | do | 10,000 |
| Resistance 30 | do | 4,700 |
| Resistance 32 | do | 27,000 |
| Condenser 26 | microfarads | 0.022 |
| Condenser 15 | do | 0.022 |
| Condenser 24 | do | 0.05 |
| Condenser 224 | do | 0.1 |

Figure 3:
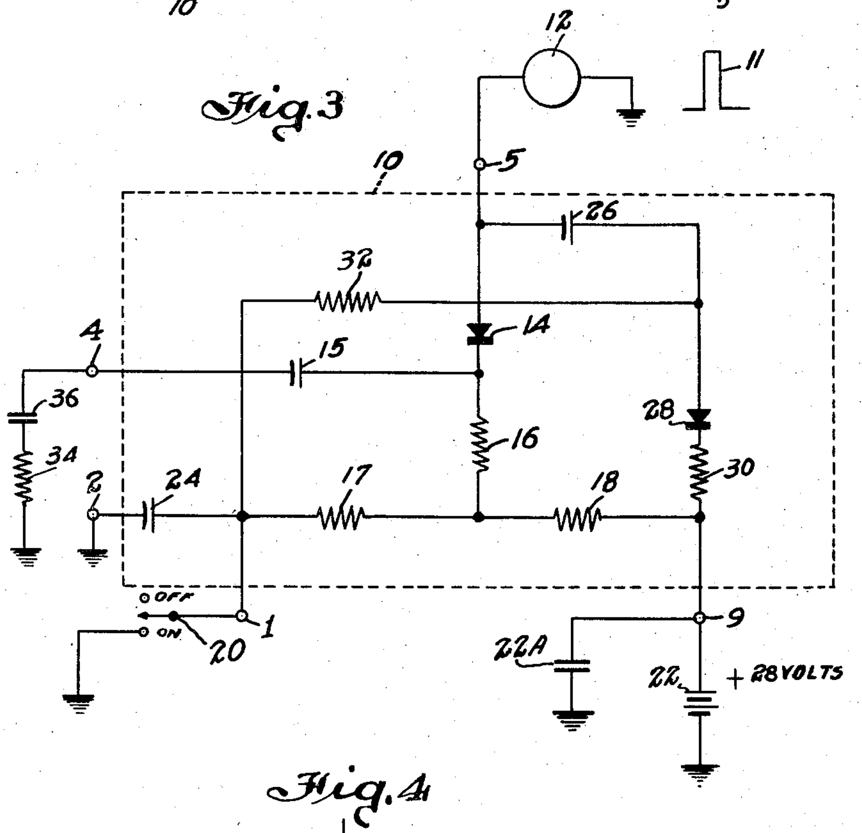
Figure 3 is a schematic diagram of the circuitry of the switch shown in Figure 1.
Figure 4:
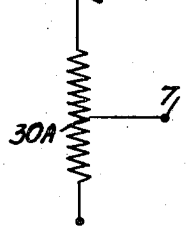
Figure 4 is a modification of the circuitry of the switch shown in Figure 3.

As explained above, a current flows through the resistance 30 when the control terminal 1 is ungrounded. The resulting voltage on resistance 30 may be applied to another load circuit. Thus, in the modification shown in Figure 4, the resistance 30 in Figure 3 is replaced by resistance 30A of different magnitude, for proper balancing, and a tap on the same may be connected to a second output pin 7. In such case there is an output for each of the two positions of switch 29, and the composite switch serves generally the function of a single pole-double throw switch instead of merely an On-Off switch.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Switching means comprising a device having an input terminal, an output terminal, a control terminal and a bias voltage terminal, a pair of resistances connected between said control terminal and said bias voltage terminal, a diode connected between said input and said output terminals and having an element thereof conductively connected to the junction of said resistances, a condenser connected between said control terminal and ground and charged through said resistances, a second diode having one of its terminals connected to said input terminal and to the charged terminal of said condenser, a third resistance connected between said control terminal and said one terminal of said second diode, and a fourth resistance connecting the other terminal of said second diode to said bias voltage terminal.

2. Switching means comprising a first diode and a second diode, a bias voltage terminal, first conductive means connecting like elements of said first and second diodes to said bias voltage terminal, a control terminal, second conductive means connecting said control terminal to said first conductive means, an input terminal and an output terminal, said first diode being connected between said input and output terminals, condenser means connected to said second conductive means and adapted to be charged through a circuit which includes said second conductive means and a portion of said first conductive means, a conductive connection between said control terminal and the other element of said second diode, second condenser means coupling said input terminal to said other element of said second diode, and a switch connected to said control terminal for short circuiting said condenser means.

3. Switching means of the character described comprising a source of bias voltage, a resistance network, a condenser, said source, network and condenser being connected in series, a switch connected in shunt with said condenser to short circuit the same, a first and a second diode having like elements thereof connected to different points on said network, an input terminal and an output terminal and said first diode being serially connected between the same, the other element of said second diode being connected to said condenser and also to said input terminal.

4. Switching means circuitry comprising a pair of diodes, a bias voltage terminal, a control terminal, an input and an output terminal, a ground terminal, a condenser having one terminal connected to said ground terminal, a resistance network connecting the other terminal of said condenser to said bias voltage terminal, said diodes having like elements thereof connected to different points on said resistance network, said other terminal of said condenser being connected to said control terminal, said first diode being serially connected between said input and output terminals, resistance means connecting said other terminal of said condenser to a different element of said second diode different from said like element, means connecting said different element to said input terminal.

5. An arrangement as set forth in claim 4 in which said circuitry is disposed within a sealed container, and said terminals comprise plug-in type pins mounted on said container to provide a plug-in assembly.

6. Switching means as set forth in claim 1, in which said fourth resistance has a tap thereon serving as a second output terminal.

7. Switching means comprising a self-contained unit having an input terminal, an output terminal, a ground terminal, a control terminal, and a bias terminal, a first resistance, a second resistance, a first condenser, said first resistance, second resistance and first condenser being connected in that order between the bias terminal and the ground terminal, said control terminal being connected to the junction point of said second resistance and said first condenser, a first diode and a second diode, a second condenser, said first diode and said second condenser being serially connected in that order between the input terminal and the output terminal; a third resistance having one of its terminals connected to the junction point of said first and second resistances and having its other terminal connected to the junction point of said first diode and said second condenser; a third condenser having one of its terminals connected to said input terminal and the other one of its terminals connected to one terminal of said second diode, the other terminal of said second diode being connected through a fourth resistance to said bias terminal; a fifth resistance connected between said control terminal and said one terminal of said second diode.

8. An arrangement as set forth in claim 7, in which said self-contained switching means is disposed within a sealed container, and said terminals comprise plug-in type pins mounted on said container to provide a plug-in assembly.

9. An arrangement as set forth in claim 7, including a fourth condenser having one of its terminals grounded and the other one of its terminals connected to said bias terminal, and a single-pole single-throw switch having one of its terminals grounded and the other one of its terminals connected to said control terminal.

10. An arrangement as set forth in claim 9, in which said fourth resistance has a tap thereon serving as a second output terminal.

11. Switching means comprising a first diode and a second diode, a bias terminal, a ground terminal, a control terminal, a conductive voltage dividing circuit connected between said bias terminal and said control terminal, a first condenser connected between said control terminal and said ground terminal and charged from said bias terminal through said voltage dividing network, a single-pole single-throw switch having one of its terminals grounded and the other one of its terminals connected to said control terminal for shortcircuiting said first condenser, like elements of said first and second diodes being connected to different points on said voltage dividing network through first and second conductive means respectively, third conductive means connecting the other terminal of said second diode to said control terminal, an input terminal, a second condenser connecting said other element of said second diode to said input terminal, an output terminal, said first diode being connected between said input and output terminals, a third condenser having one of its terminals grounded and the other one of its terminals connected to said bias terminal, a source of bias voltage connected to said bias voltage terminal, and a load having one of its terminals grounded and the other one of its terminals connected to said output terminal.

12. Switching means of the character described, comprising a first diode, a second diode, an input terminal, like elements of said first and second diodes being connected respectively to said input terminal through a conductive connection and a capacitive connection, a bias voltage terminal, a control terminal, a conductive voltage dividing network connected between said bias voltage terminal and said control terminal, the other elements of said first and second diodes being conductively connected respectively to different points on said voltage dividing network, a conductive connection between said control terminal and the first mentioned element of said second diode, a ground terminal, a condenser connected between said ground terminal and said control terminal and charged through said voltage dividing network, a single-pole single-throw switch having one of its terminals grounded and the other one of its terminals connected to said control terminal for shortcircuiting said condenser.

13. Switching means comprising an input terminal, a bias voltage terminal, a first condenser, a first diode, a first resistance, a second condenser, a first current path including, in this order, said input terminal, said first condenser, said first diode, said first resistance, and said second condenser; an output terminal, a second diode, a third condenser, a second current path including, in this order, said input terminal, said second diode, said third condenser and said output terminal; a control terminal, a conductive voltage dividing network connected between said bias voltage terminal and said control terminal, a second resistance, like elements of said first and second diodes being connected to different spaced points on said voltage dividing network through said first and second resistances respectively, a ground terminal, a third condenser having one of its terminals connected to said ground terminal and the other one of its terminals connected to said control terminal and charged through said voltage dividing network, a single-pole single-throw switch having one of its terminals grounded and the other one of its terminals connected to said control terminal for shortcircuiting said third condenser, said switch in its closed position serving effectively to interrupt said first current path, and said switch in its open position serving effectively to interrupt said second current path.

References Cited in the file of this patent

UNITED STATES PATENTS

| | | |
|---|---|---|
| 2,466,959 | Moore | Apr. 12, 1949 |
| 2,483,823 | George | Oct. 4, 1949 |
| 2,541,399 | Blake | Feb. 12, 1951 |
| 2,590,821 | Kiser | Mar. 25, 1952 |